United States Patent
Samuelson (12)

(10) Patent No.: US 6,330,133 B1
(45) Date of Patent: Dec. 11, 2001

(54) TRAILING EDGE RAIL SHAPING (75) Inventor: Laurence Scott Samuelson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/298,147

(22) Filed: Apr. 22, 1999

(51) Int. Cl.[7] .................................................. G11B 5/48
(52) U.S. Cl. .............................................. 360/243.3
(58) Field of Search .................. 360/234.3, 235.1–235.4, 360/235.8

(56) References Cited

U.S. PATENT DOCUMENTS

| | | |
|---|---|---|
| 3,823,416 | 7/1974 | Warner ................................ 360/122 |
| 4,636,894 | 1/1987 | Mo . |
| 4,698,716 | 10/1987 | Lazzari ................................ 360/135 |
| 4,984,114 | 1/1991 | Takeuchi et al. . |
| 5,287,235 | 2/1994 | Cunningham et al. . |
| 5,473,485 | 12/1995 | Leung et al. . |
| 5,508,862 | 4/1996 | Lazzari et al. . |
| 5,526,204 | 6/1996 | French et al. ..................... 360/97.02 |
| 5,550,693 | 8/1996 | Hendriks et al. . |
| 5,774,303 | * 6/1998 | Teng et al. . |
| 5,841,608 | * 11/1998 | Kasamatsu et al. ............... 360/235.2 |
| 5,864,452 | * 1/1999 | Hirano et al. ...................... 360/235.2 |
| 5,982,583 | * 11/1999 | Strom . |
| 6,181,517 | * 1/2001 | Yanagisawa et al. ............. 360/235.4 |

FOREIGN PATENT DOCUMENTS

| | | |
|---|---|---|
| 06-52552 | 5/1995 | (EP) . |
| 53-29710 | 3/1978 | (JP) . |
| 06-004847 | 1/1994 | (JP) . |

* cited by examiner

Primary Examiner—Allen Cao
(74) Attorney, Agent, or Firm—Monica D. Lee; Lewis L. Nunnelley (57) ABSTRACT An air bearing slider having at least one air bearing pad with a trailing edge shaped to provide the desired flying height profile. The air bearing includes a slider body having leading and trailing edges, an air bearing surface and a first surface recessed with respect to the air bearing surface. Furthermore, the air bearing slider includes at least one compression region. The air bearing surface includes at least one air bearing pad having diverging side edges, a leading edge and a trailing edge. The leading edge of each air bearing pad is positioned substantially adjacent to a compression region. The trailing edge of each air bearing pad has a curvature shaped to provide a desired flying height profile of the air bearing slider.

20 Claims, 10 Drawing Sheets

FIG. 1A

PRIOR ART

FIG. 1B

PRIOR ART

FIG. 8B ively flat, the flying height is lowest near the MD.
TRAILING EDGE RAIL SHAPING

BACKGROUND OF THE INVENTION

1. Field of the Invention

This invention relates generally to magnetic storage systems, and more particularly, to air bearing sliders having air bearing pads shaped to provide a desired flying height profile.

2. Description of Related Art

A magnetic storage system typically includes one or more magnetic disks with at least one data recording surface having a plurality of concentric tracks for storing data. A spindle motor and spindle motor controller rotate the disk(s) at a selected rotations per minute (rpm) such that at least one read/write transducer or "head" per recording surface can read data from or write data to each recording surface. The data read or written from each recording surface is processed by a read/write channel. The transducer is supported by an air bearing slider which has a top surface attached to an actuator assembly via a suspension, and a bottom surface having an air bearing design of a desired configuration to provide favorable flying height characteristics. During the operation of the magnetic storage device, the air bearing slider is positioned in close proximity above the desired data track by an actuator assembly. The movement of the actuator assembly above the disk surface is controlled by a servo system.

In magnetic recording technology, it is continually desired to improve the areal density at which information can be recorded and reliably read. Because the recording density of a magnetic storage system is limited by the distance between the transducer and the recording surface of the disk, it is generally desirable to design an air bearing slider to "fly" as closely as possible to the recording surface of the disk while avoiding physical impact with the disk. Smaller spacings, or "flying heights" allow the transducer to distinguish between the magnetic fields emanating from closely spaced regions on the disk.

The flying height of the slider is typically affected as the actuator arm is moved radially to access different data tracks from the inner-diameter (ID) radius to the outer-diameter (OD) radius of the disk surface. This is primarily due to differences in the linear velocity of the disk at differing radii. In effect, the air bearing slider flies at different heights at differing radii. A slider typically flies higher as velocity increases. However, a slider also experiences changes in flying height due to variations in skew. Skew is a measure of the angle formed between the longitudinal axis of the slider and the direction of disk rotation as measured in a plane parallel to the disk. Skew varies in a magnetic storage system that includes a rotary actuator as the suspension and attached slider move in arcuate path across the disk surface. For rotary actuators, the slider typically has a more positive skew at the OD, a more negative skew at the ID, and a substantially zero skew at the MD. Skew also varies, to a lesser degree, in a linear actuator magnetic storage system when a resiliently mounted slider moves in response to forces exerted upon it. For sliders positioned by either type of actuator, non-zero skew values result in a slider being pressurized less and therefore flying lower.

Taking into consideration that the velocity and skew of the slider varies across the different zones of the disk surface, the flying height profile is typically higher at the middle-diameter (MD) zone of the disk surface and lower around the inner-diameter (ID) and outer-diameter (OD) zones of the disk surface. But for many magnetic storage systems, it is desirable to design an air bearing slider that maintains a generally constant "flying height" between the read/write head the disk surface across all data zones, from the inner-diameter (ID) radius to the outer-diameter (OD) radius of the disk.

Figure 1A:
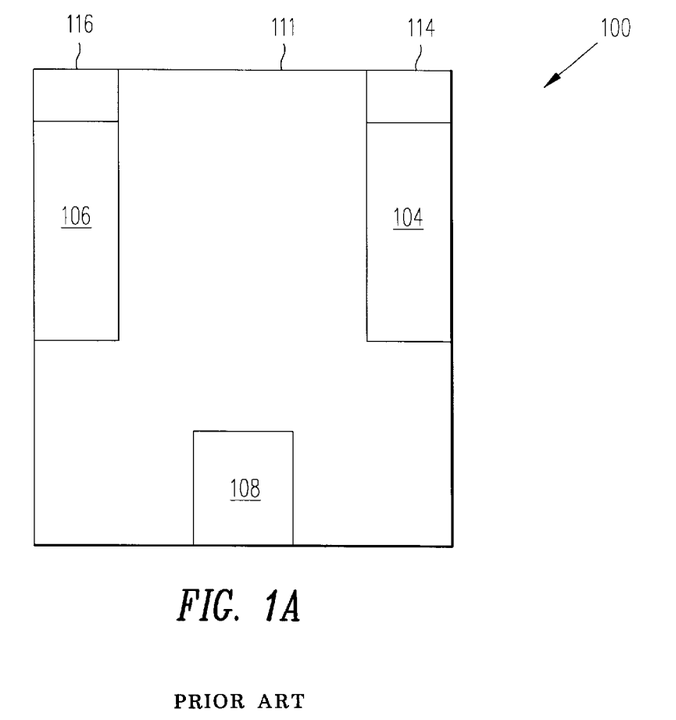
FIG. 1A illustrates a conventional tri-pad air bearing slider design.

FIG. 1A represents a conventional slider 100 having a tri-pad air bearing design. The air bearing surface is formed by three air bearing pads 104, 106, and 108. Pads 104 and 106 are formed substantially adjacent to the leading edge 111 of slider 100 and pad 108 is formed substantially adjacent to the trailing edge 110 of slider 100. Stepped or ramped surfaces 114 and 116 are formed along the leading edge of air bearing pads 104 and 106, respectively.

Figure 1B:
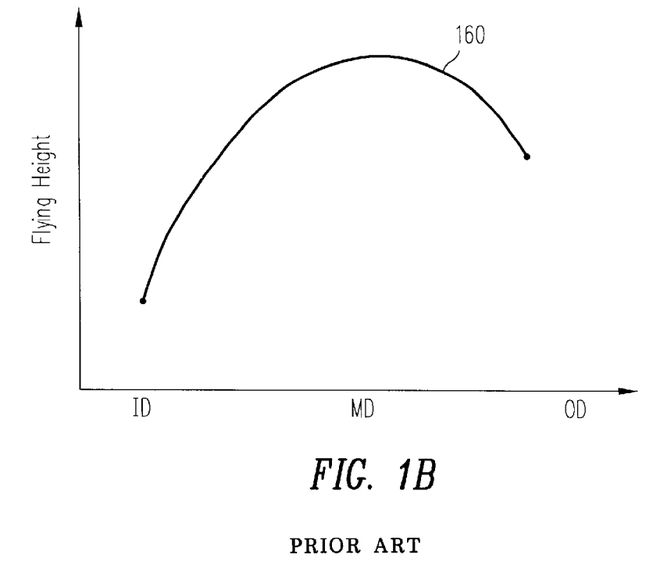
FIG. 1B illustrates a flying height profile for the slider shown in FIG. 1A.

FIG. 1B illustrates the flying height profile of slider 100. Generally, a flying height profile represents the flying height of a slider as the slider flies from the ID radius to the OD radius of the disk surface. The flying height profile 160 is a relatively steep profile with the lower flying heights at the ID and OD radii of the disk surface and the highest flying height at the MD radius of the disk surface.

Under certain circumstances, it may be desirable to adjust the flying height profile. For example, certain magnetic storage systems may operate more efficiently when the flying height is lowest at the MD while slightly higher at the OD and ID. One approach to adjusting the flying height profile of a slider is to provide air bearing pads or rails having diverging side edges as described in patent application Ser. No. 08/731,606 entitled "Method and Apparatus for Providing Diverging Rail Edge Geometry for Air Bearing Slider," which is assigned to the same assignee as the present invention. By providing a slider having a wider downstream area than upstream area, relatively constant pressure can be maintained as the skew angle varies while the air flow changes direction.

FIG. 2 illustrates an air bearing pad 200 that may be used in various air bearing designs. For example, one or more rectangular air bearing pads (including associated compression feature) shown in FIG. 1 may be replaced with one or more air bearing pads 200 (including associated compression feature 210). The diverging region for pad 200 is downstream from the the leading edge of pad 200.

Figure 2A:
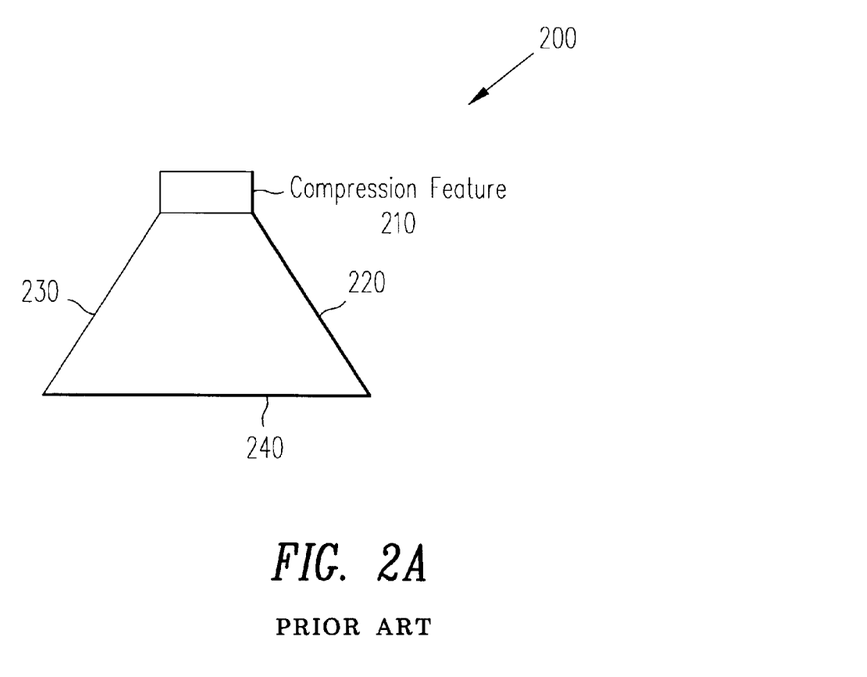
FIG. 2A illustrates a conventional air bearing pad having diverging side rails.
Figure 2B:
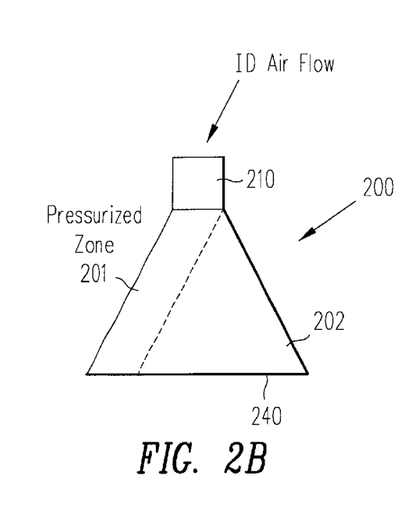
FIGS. 2B–2D illustrate pressurization zones of the air bearing pad shown in FIG. 2A under various air flow conditions.
Figure 2C:
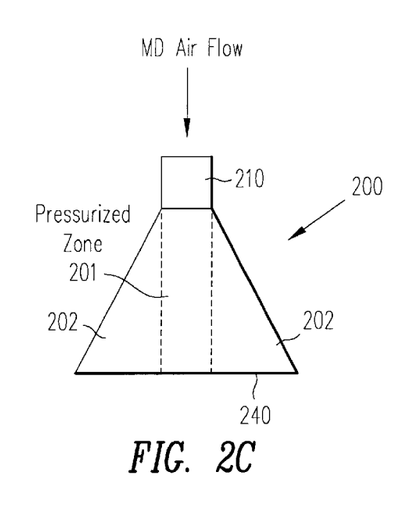
Figure 2D:
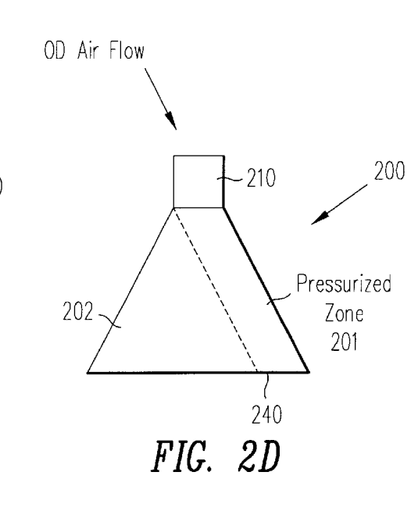

Consequently, the pressure build up resulting from pad 200 occurs collinearly with the direction of air flow under skewed conditions. In other words, only the area downstream from tapered region 210 pressurizes. Note that areas 202 away from pressurization zone 201 do not pressurize and therefore do not contribute to the air bearing. FIGS. 2B–2D illustrate the various air flow conditions (i.e., ID air flow, MD air flow, and OD air flow) and how the pressurization zone 201 changes with respect to the direction of the air flow. As the air flow changes direction, the pressure peak 214 shifts with the air flow.

Figure 2E:
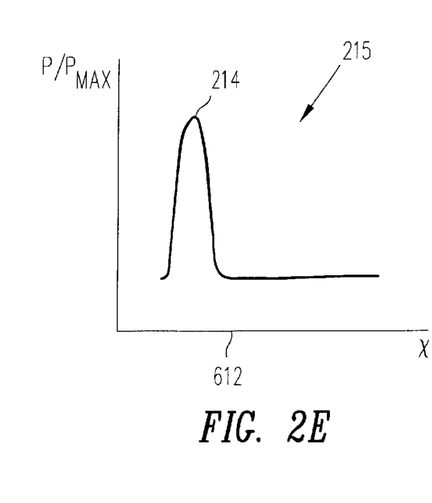
FIGS. 2E–2G illustrate normalized pressure contours of the pressurization zones shown in FIGS. 2B–2D.
Figure 2F:
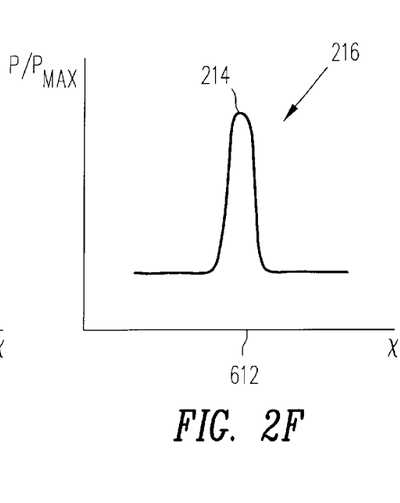
Figure 2G:
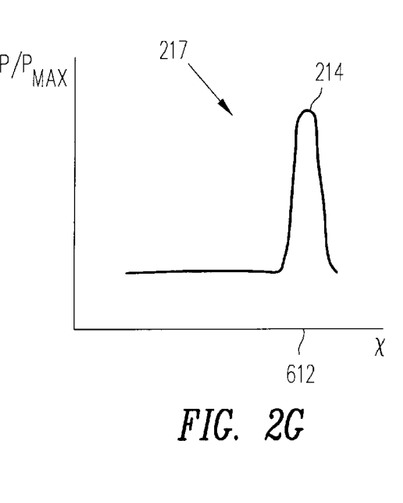

FIGS. 2E–2G show the normalized pressure contours 215–217 taken along the width of the trailing edge 240 of pad 200 for the various conditions. FIG. 2E corresponds to an ID air flow condition, FIG. 2F corresponds to an MD air flow condition, and FIG. 2G corresponds to an OD air flow condition. Generally, pressure peak 214 is shifted toward pressurization zone 201 while the portion 202 remains at or near ambient pressure.

Figure 2H:
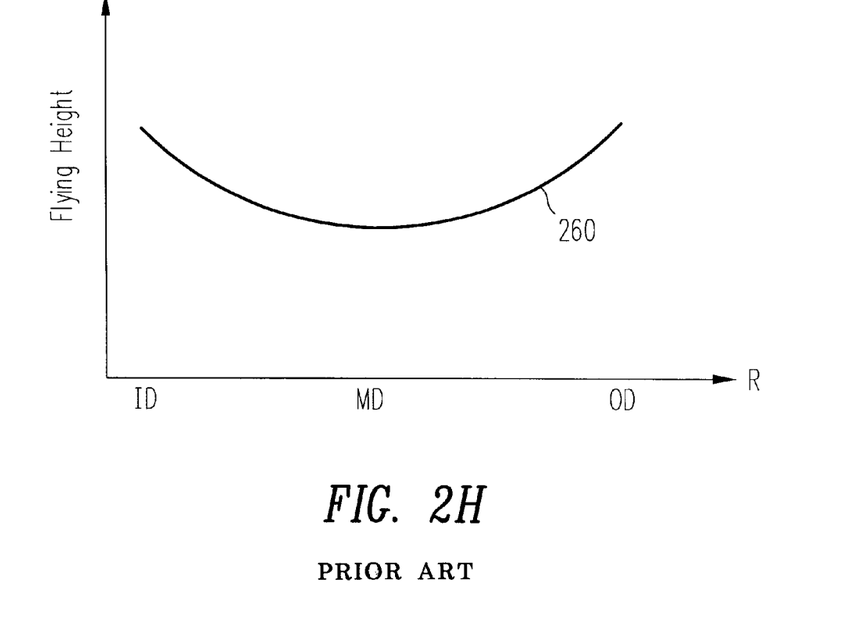
FIG. 2H illustrates a flying height profile for a tri-pad air bearing slider having three air bearing pads with diverging side rails.

FIG. 2H illustrates a flying height profile for a tri-pad air bearing design incorporating three air bearing pads 200 having diverging side rails. Although flying height profile 260 is relatively flat, the flying height is lowest near the MD. As mentioned above, this particular flying height profile may be desirable for certain magnetic storage systems.

The flying height profiles shown in FIGS. 1B and 2H may not be suitable for certain magnetic storage system configurations. For example, magnetic storage systems that operate in a contact start-stop mode may include a textured landing zone located at either the ID or OD zone of a disk surface. The textured landing zone may require that the slider fly slightly higher over the landing zone than the data zone to avoid the bumps or protrusion in the textured zone rather than a flying relatively flat across the various zones on the disk surface. Thus, there is a need for an air bearing slider having air bearing pads and/or rails that can be shaped to provide the desired flying height profile.

SUMMARY OF THE INVENTION

It is desirable to tailor the flying height profile of an air bearing slider for the specific needs of a particular magnetic storage system.

It is also desirable to adjust the flying height profile of a slider by adjusting the curvature of the trailing edge of at least one air bearing pad.

An air bearing slider is described. The air bearing includes a slider body having leading and trailing edges, an air bearing surface and a first surface recessed with respect to the air bearing surface. Furthermore, the air bearing slider includes at least one compression region. The air bearing surface includes at least one air bearing pad having diverging side edges, a leading edge and a trailing edge. The leading edge of each air bearing pad is positioned substantially adjacent to a compression region. The trailing edge of each air bearing pad has a curvature shaped to provide a desired flying height profile of the air bearing slider.

One aspect of the present invention is that the trailing edge of one of the air bearing pads has an asymmetrical bell shaped curvature.

Another aspect of the present invention is that the trailing edge of one of the air bearing pads has a substantially bell shaped curvature.

Other desires, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 3:
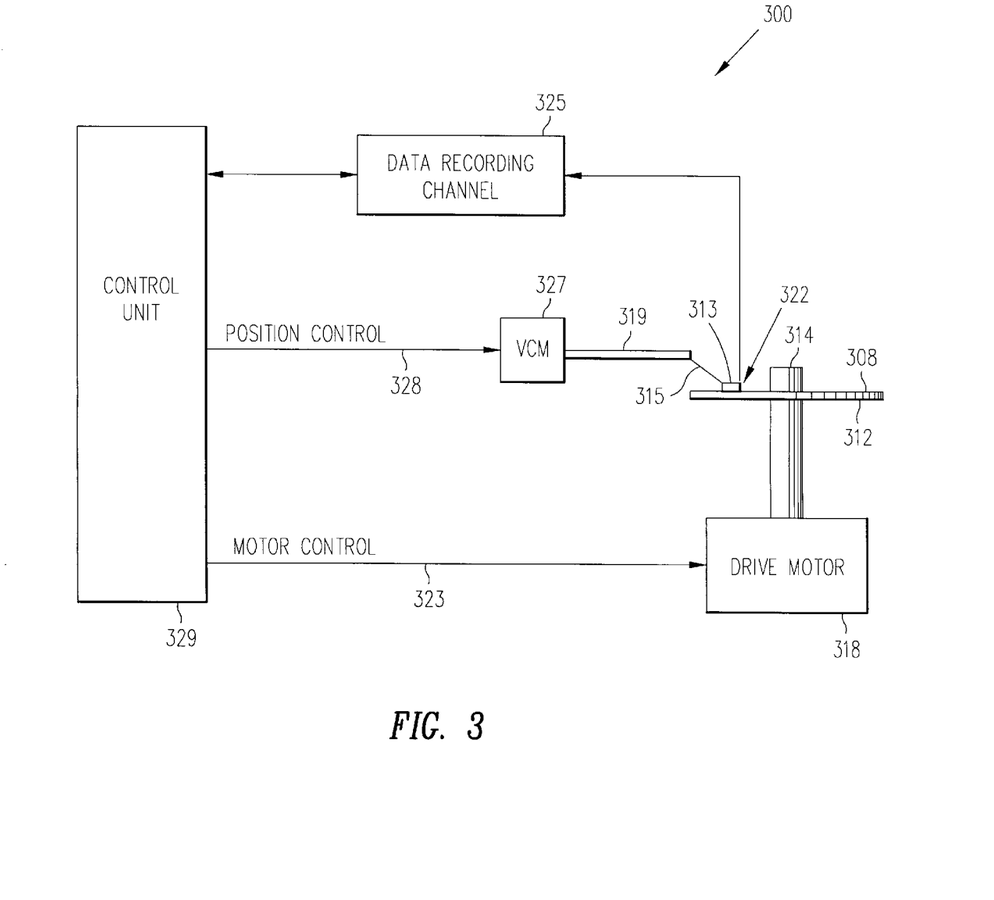
FIGS. 3 illustrates one embodiment of a magnetic storage system.

The present invention describes an air bearing slider having at least one air bearing pad or rail shaped to provide the desired flying height profile. For some magnetic storage systems, it may be desirable to provide a relatively flat flying height profile across the various data zones, while for other magnetic storage systems it may be more desirable to provide a higher flying height towards the ID zone and/or OD zone. FIG. 3 illustrates one embodiment of a magnetic storage system. Magnetic storage system 300 includes at least one rotatable magnetic disk 312 supported on a spindle 314 which is rotated by a disk drive motor 318. When accessing data from disk 312, at least one slider 313 positioned above disk 312. Each slider 313 supports at least one magnetic read/write head 322 which is integrally formed with slider 313 or attached to slider 313. The head may be centrally located at the trailing end or located at one side of the trailing end of slider 313.

The magnetic recording media on each disk 312 includes an annular pattern of concentric data tracks (not shown). As disk 312 rotates, slider 313 is moved radially or along an arcuate path over a disk surface 308 so that data may be accessed from a selected portion of a data track via head 322. For contact start-stop magnetic storage system, disk surface 308 is typically textured to help prevent adhesion of the slider 313 to the disk surface 308 which could affect drive spin-up. Texturizing may be performed either uniformly over the entire disk surface, or locally in a specific zone at the inner diameter of the disk dedicated for starting and stopping (not shown). When operating in a contact start/stop mode the slider drags on the disk surface until sufficient air-bearing is generated to lift the slider off the disk surface.

Each slider 313 is attached at its upper surface to an actuator arm 319 by a suspension 315. The suspension 315 provides a slight spring force which biases slider 113 against disk surface 308. Each actuator arm 319 is attached to an actuator 327. The actuator 327, as shown in FIG. 3 may be a voice coil motor (VCM) that includes a coil moveable within a fixed magnetic field. Typically, the direction and velocity of the coil movements are controlled by a control signal supplied by a servo system controller.

During operation of magnetic storage system 300, the rotation of disk 312 generates an air bearing between slider 313 and disk surface 308 which exerts an upward force or positive pressure on the lower surface (also known as air bearing surface) of slider 313. Generally, as disk 312 begins to rotate an air flow is generated which enters the leading edge of slider 313 and flows in the direction of the trailing edge of slider 313. The air bearing surface typically includes a plurality of air bearing rails or pads shaped to provide the desired flying characteristics. The positive pressure generated on these rails counterbalance the slight spring force of suspension 315 and supports the slider 313 off and slightly above disk surface 308 by a small, substantially constant spacing during operation. The slider 313 may also include negative pressure regions for counteracting the positive pressure to provide a flatter flying height profile.

The various components of magnetic storage system 300 are controlled in operation by control signals generated by control unit 329, such as access control signals and internal clock signals. The control unit 329 may include logic control circuits, memory devices, and a microprocessor. The control unit 329 generates control signals such as drive motor control signals on line 323 and head position and seek control signals on line 328. The control signals on line 328 provide the desired current profiles to optimally move and position a selected slider 313 to the desired data track on the associated disk 312. Read and write signals are communicated to and from read/write heads 321 by a recording channel 325.

Figure 4:
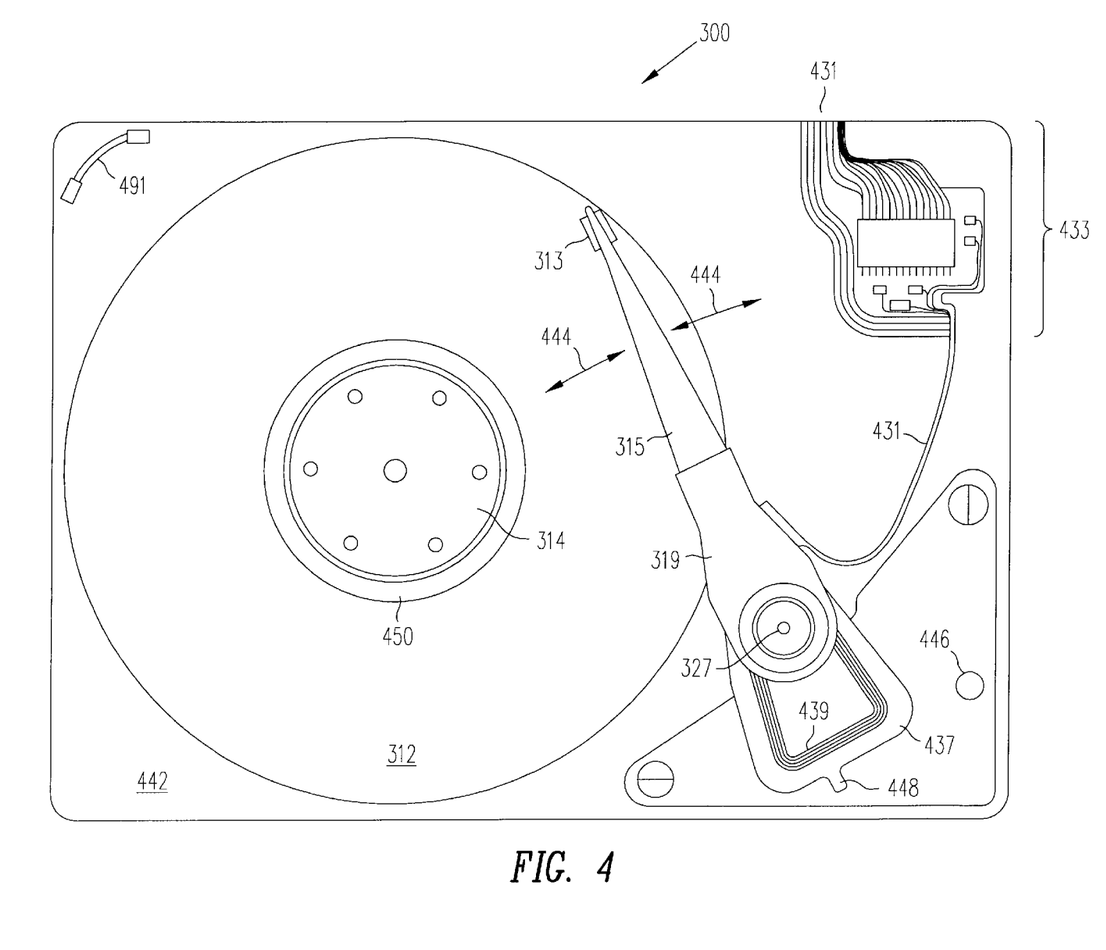
FIG. 4 illustrates a top view of the magnetic storage system shown in FIG. 3.

FIG. 4 illustrates a top view of magnetic storage system 300. Magnetic storage system 300 includes a rotary actuator 319 and air bearing slider 313 supporting head 322 (not shown). The actuator 319 is coupled to slider 313 via suspension 315. During data access operations, actuator 319 selectively positions the transducer over disk 312 in response to a control signal from the control servo electronics. The control servo electronics may be located on a printed circuit board attached to a base 442 of disk storage system 300. The control signal and information to be written to disk 312 are provided to actuator 319 through a connector circuit 433, which typically includes an arm electronics module. Information read from disk 312 by head 322 is transmitted through a flex cable 431 and connector circuit 433 to a read/write channel, which may also be located on the printed circuit board.

The actuator 319 rotates about an axis 327 in the directions indicated by arrows 444. A voice coil 439 is provided at one end of actuator 319 between two pairs of permanent magnets, one of which is shown by 437. The outer magnet is attached to the inner side of magnetic storage system 300. The control signal from the servo control electronics causes a current to flow in voice coil 439 and to generate a magnetic flux. The flux creates force in either direction parallel to the surface of the permanent magnets 437, causing actuator 319 to move in a desired direction. Actuator movement is limited by one or more crash stops 446 that block the range of movement of protrusion 448. During periods when data access operations are not in progress or when disk 312 is not spinning, the servo control electronics commands actuator 319 to move slider 313 to the designated contact start-stop zone 450. The above description of magnetic storage system is for representation purposes only and the present invention may be extended to various other magnetic storage system configurations.

Figure 5A:
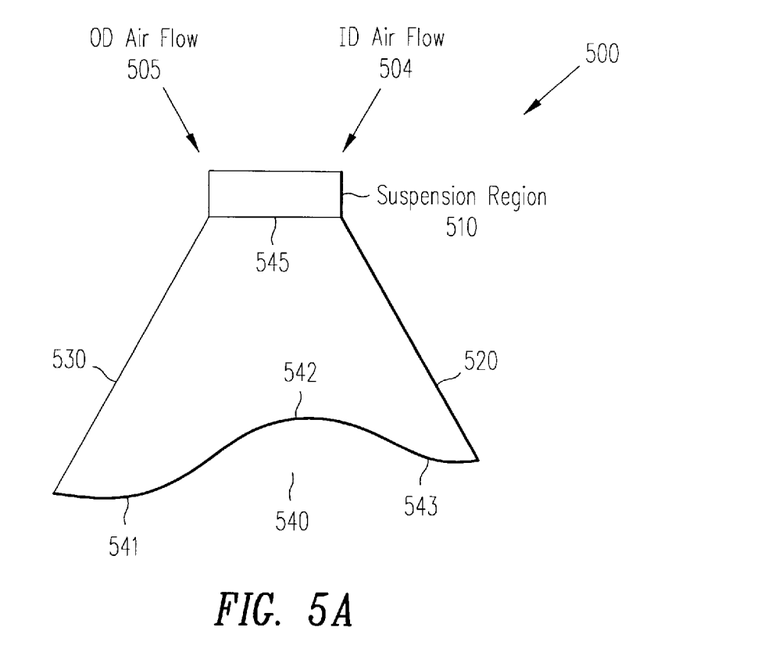
FIG. 5A illustrates one embodiment of an air bearing pad of the present invention.
Figure 5B:
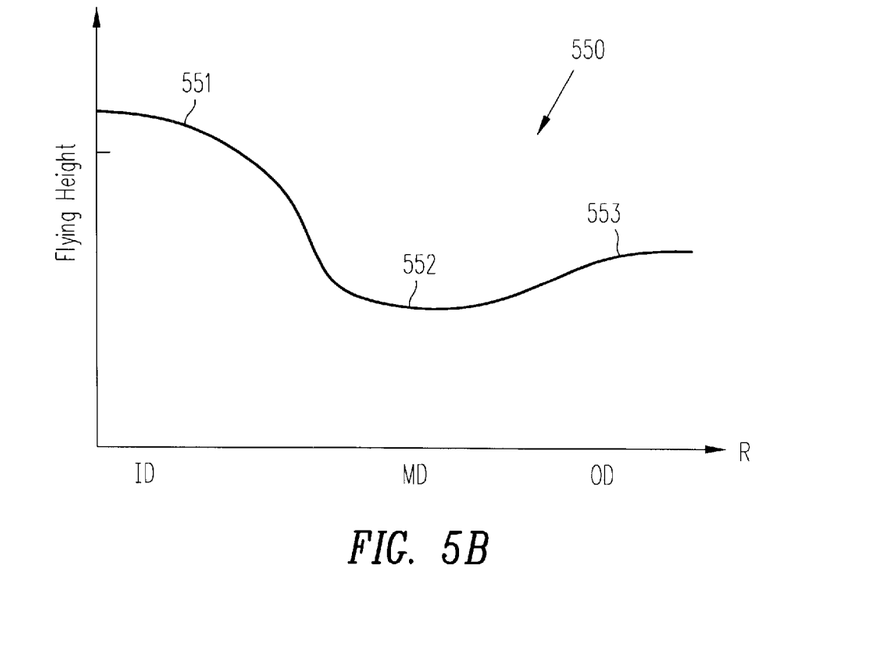
FIG. 5B illustrates a flying height profile of a tri-pad air bearing design that includes three air bearing pads 500.

FIG. 5B illustrates one example of a desired flying height profile. The flying height profile 550 is particularly well suited for contact start/stop magnetic storage systems that use zone texturing at the ID of the disk surface. As mentioned above, zone texturing improves stiction at the head-to-disk interface during start-up. The flying height profile 550 measures the flying height of a slider with respect to the radius of the disk surface as the slider is moved from the ID to the OD of the disk surface. The texturized ID zone is typically dedicated for starting and stopping and is often referred to as the landing zone. The smooth portion of the disk surface at the MD and OD may be referred to as the data zones.

The flying height above the ID zone is generally dictated by the stiction performance in the textured zone. In the textured ID zone, the slider must achieve lift quickly and obtain a flying height that is higher than necessary over the smooth data zones. Portion 551 of the flying height profile 550 represents the flying height profile over the textured landing zone at the ID of the disk surface.

However, as the slider moves across the MD zone, which represent a smooth data zone, the flying height may be lowered. Apparently, there is no mechanical need to fly the slider as high as in the textured zone. Portion 552 of the flying height profile 550 represents the flying height profile over the smooth data zone at the MD.

As the slider moves further towards the smooth data zones at the OD, it may be desirable to slightly increase the flying height of the slider to avoid any asperities that may have formed on the OD zone of the disk surface. In some magnetic storage systems, it has been found that there is a tendency to have more disk asperities at the OD than other parts of the disk surface and therefore it is desirable to slightly increase the flying height over the OD to avoid such asperities. Portion 553 of the flying height profile 550 represents the flying height profile over the smooth data zone at the OD.

FIG. 5B illustrates the flying height profile for a tri-pad air bearing design having three air bearing pads 500. As mentioned above, a tri-pad air bearing design includes three air bearing pads with two near the leading edge of the slider and one near the trailing edge of the slider. FIG. 5A illustrates an air bearing pad 500 having its trailing edge shaped to adjust the flying height profile. Although air bearing pad 500 is described as being incorporated into a positive pressure tri-pad air bearing design, air bearing pad 500 may be used in various other positive and negative pressure air bearing designs.

Air bearing pad 500 includes a leading edge 545, which is aligned with a compression region 510. Compression region 510 may include a taper or a shallow stepped surface that provides air bearing pad 500 with sufficient compression. Similar to the prior art air bearing pad 200, air bearing pad 500 includes diverging rail edges 520 and 530 such that the downstream area of air bearing pad 500 is wider than the upstream area of air bearing pad 500. However, unlike the prior art air bearing pad 200, air bearing pad 500 does not include a substantially straight trailing edge that is substantially parallel with a trailing edge of a slider. For one embodiment, leading edge of air bearing pad 500 is substantially parallel to the leading edge of a slider while trailing edge 540 has asymmetrical bell-shaped curve formed by sections 542, 542, and 543.

Arrows 504 and 505 illustrate the OD air flow direction and the ID air flow direction respectively, as the slider is being moved across the disk surface. Generally, the flying height is dependent upon the pressurization provided by the air bearing pads or rails. Thus, the pressure build up resulting from air bearing pad 500 occurs collinearly with the direction of air flow under skewed conditions. According to FIG. 5A the portion of the slider along the trailing edge portion 541 provides a long feature while the portion of the slider along the trailing edge portion 543 provides a short feature.

Figures 5C, 5D, 5E:
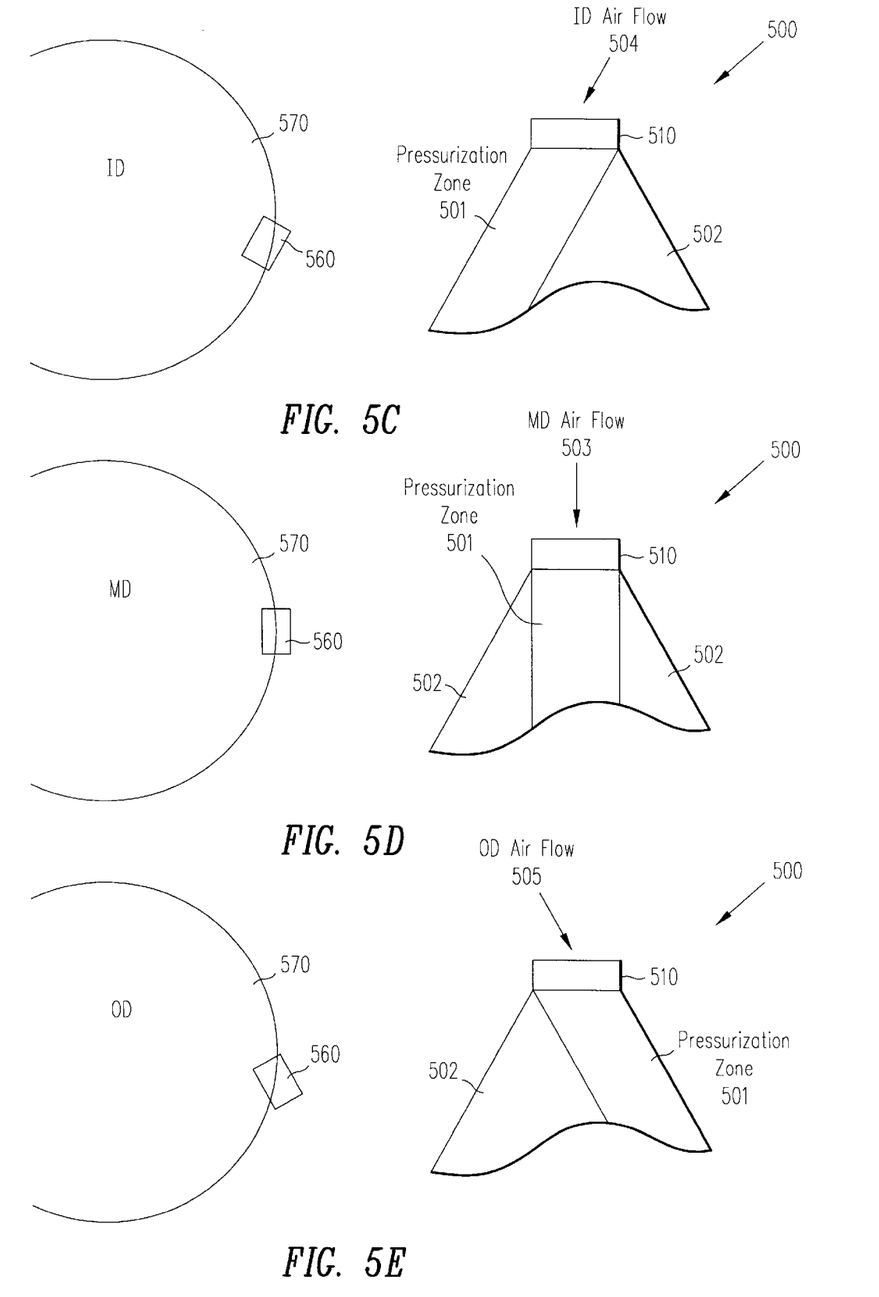
FIGS. 5C–5E illustrates the various air flow conditions of the air bearing pad shown in FIG. 5A.

FIGS. 5C–5E illustrate the various air flow conditions of an air bearing slider 560 that includes at least one air bearing pad 500. FIG. 5C illustrates slider 560 flying above the ID zone of disk surface 570; FIG. 5D illustrates slider 560 flying above the MD zone of disk surface 570; and FIG. 5E illustrates slider 560 flying above the OD zone of disk surface 570. When slider 560 is flying under ID air flow conditions, slider 560 has a negative skew angle, and when slider 560 is flying under MD air flow conditions, slider 560 has a substantially zero skew angle, and when slider 560 is flying under OD air flow conditions, slider 560 has a positive skew angle. FIGS. 5C–5E also illustrate how the pressurization zone 501 and the non-pressurized area 502 changes as the air flow conditions change.

When air bearing pad 500 is operating under ID air flow conditions, the pressurization area is the largest. Additionally, the relatively low air speed and negative skew of slider 560 causes slider 560 to fly the highest at the ID zone of disk surface 570. However, at the MD, the overall area that pressurizes is smaller than at the ID, and slider 560 travels at a relatively high speed with substantially zero skew. This causes the flying height to drop as slider 560 travels across the smooth data zone at the MD. When slider 560 is flying above the relatively smooth data zone at the OD, the flying height slightly increases above the MD flying height to adjust for disk asperities. Although the pressurization area 501 at the OD is slightly larger that the pressurization area 501 at the MD, the very high air speed and the negative skew of slider 560 causes slider 560 to fly just slightly higher that at the MD.

Figure 6A:
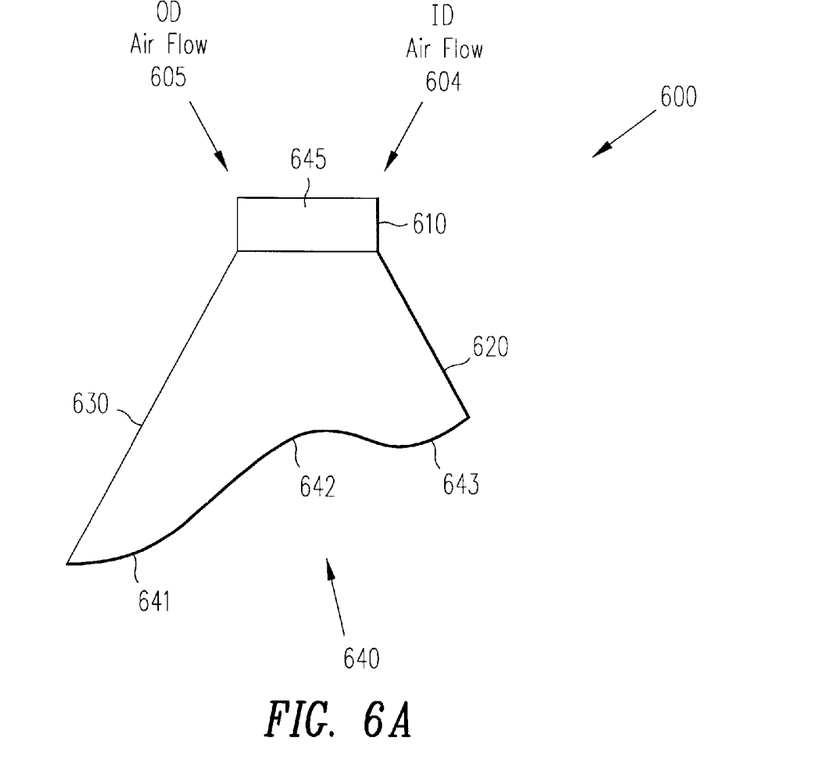
FIG. 6A illustrates one embodiment of an air bearing pad of the present invention.
Figure 6B:
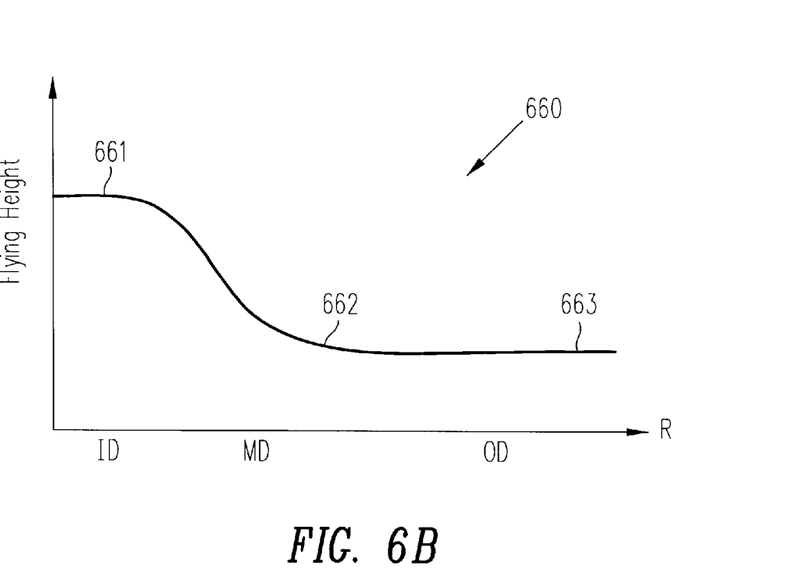
FIG. 6B illustrates the flying height profile of a tri-pad air bearing design that includes three air bearing pads 600.

FIG. 6B illustrates another example of a desired flying height profile. The flying height profile 650 is also particularly well suited for contact start/stop magnetic storage systems that use zone texturing at the ID of the disk surface to improve stiction at the head-to-disk interface during start-up. The flying height profile 650 measures the flying height of a slider with respect to the radius of the disk surface as the slider is moved from the ID to the OD of the disk surface.

The flying height profile 650 is similar to the flying height profile 550 except that the flying height above the OD remains relatively constant rather than increasing above the MD flying height. Accordingly, portion 661 of flying height profile 660 represents the flying height above the textured landing zone at the ID, and portions 662 and 663 of flying height profile 660 represents the flying height above the smooth data zones at the MD and OD. Unlike flying height profile 550, flying height profile 650 does not take into account the disk asperities that may be formed at the OD of the disk surface.

FIG. 6B illustrates the flying height profile 650 for a tri-pad air bearing design having three air bearing pads 600. FIG. 6A illustrates an air bearing pad 600 having its trailing edge shaped to adjust the flying height profile to have higher flying height at the ID, and a lower and relatively flat flying height at the MD and OD. Although air bearing pad 600 is described as being incorporated into a positive pressure tri-pad air bearing design, air bearing pad 600 may be used in various other positive and negative pressure air bearing designs.

Air bearing pad 600 includes a leading edge 645, which is aligned with a compression region 610. Compression region 610 may include a taper or a shallow stepped surface that provides air bearing pad 600 with sufficient compression. Air bearing pads 600 may include diverging rail edges 620 and 630. Note that rail edge 620 is much shorter than rail edge 520. For one embodiment, leading edge of air bearing pad 600 is substantially parallel to the leading edge of a slider while trailing edge 640 has an asymetrical bell-shaped curve formed by sections 642, 642, and 643. The shape of trailing edge 640 is very similar to the shape of trailing edge 540 except that section 643 is shorter than section 543. By shortening section 643, the slider flys relatively constant above both the MD and OD zones.

Figure 7A:
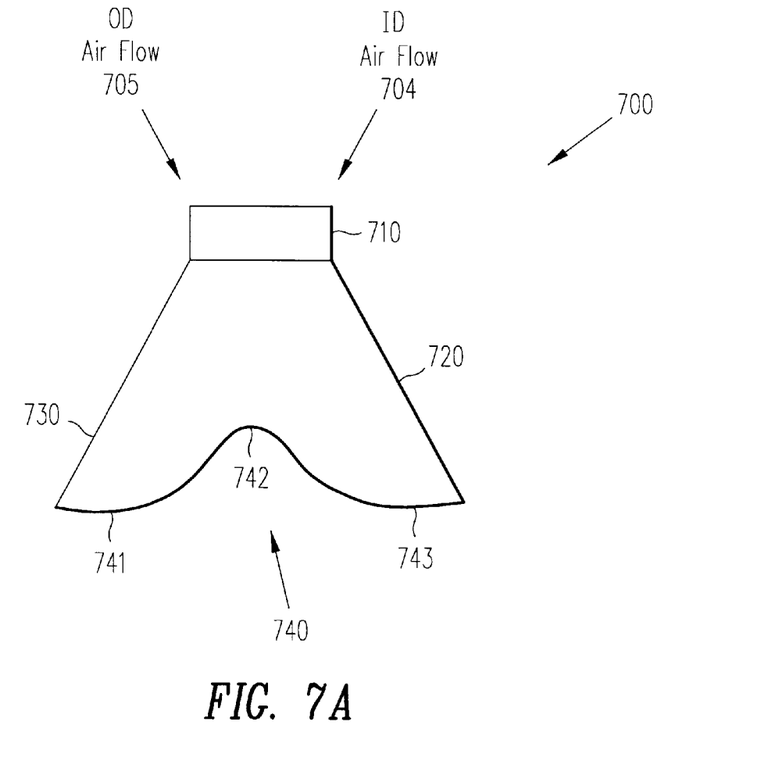
FIG. 7A illustrates one embodiment of an air bearing pad of the present invention.
Figure 7B:
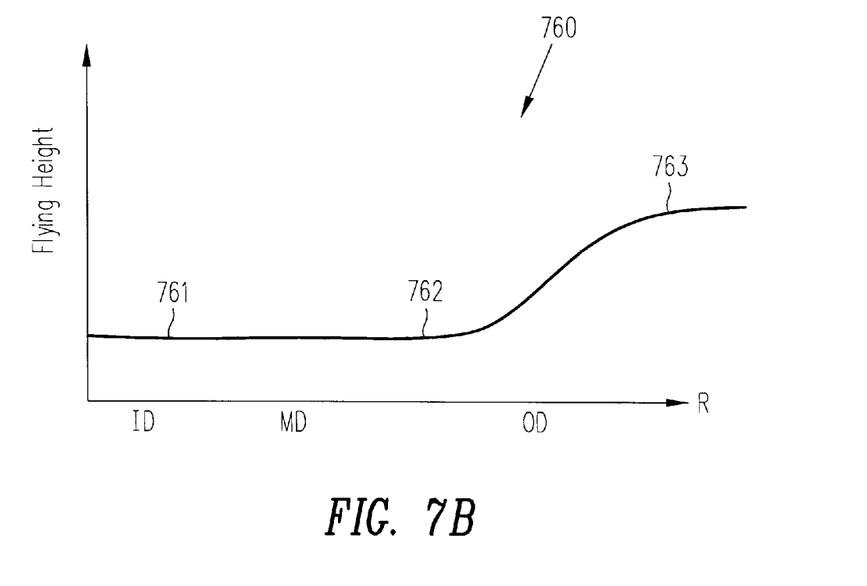
FIG. 7B illustrates a flying height profile of a tri-pad air bearing design that includes three air bearing pads 700.

FIG. 7B illustrates another example of a desired flying height profile. The flying height profile 750 is particularly well suited for contact start/stop magnetic storage systems that use zone texturing at the OD of the disk surface to improve stiction at the head-to-disk interface during start-up. The flying height profile 750 measures the flying height of a slider with respect to the radius of the disk surface as the slider is moved from the ID to the OD of the disk surface.

The flying height profile 750 is relatively flat as shown by sections 761 and 762 over the smooth ID and OD data zones of the disk surface. As the slider moves from the MD toward the OD, the flying height profile starts to increase and remains relatively flat above the OD as shown by section 763. The slider is required to fly higher above the textured landing zone at the OD.

FIG. 7B illustrates the flying height profile 750 for a tri-pad air bearing design having three air bearing pads 700. FIG. 7A illustrates an air bearing pad 700 having its trailing edge shaped to adjust the flying height profile to have higher flying height at the OD, and a lower and relatively fly flying height at the ID and MD. Although air bearing pad 700 is described as being incorporated into a positive pressure tri-pad air bearing design, air bearing pad 700 may be used in various other positive and negative pressure air bearing designs.

Air bearing pad 700 includes a leading edge 745, which is aligned with a compression region 710. Compression region 710 may include a taper or a shallow stepped surface that provides air bearing pad 700 with sufficient compression. Air bearing pads 700 may include diverging rail edges 720 and 730. Note that rail edges 720 and 730 have approximately the same length. For one embodiment, leading edge of air bearing pad 700 is substantially parallel to the leading edge of a slider while trailing edge 740 has a substantially symmetrical or a slightly asymetrical bell-shaped curve formed by sections 742, 742, and 743. The shape of trailing edge 740 appears to be more symmetrical than trailing edges 540 and 640. By providing a pressurization zone at the OD that is substantially the same size as the pressurization zone at the ID, the slider is able to fly higher at the OD.

Figure 8A:
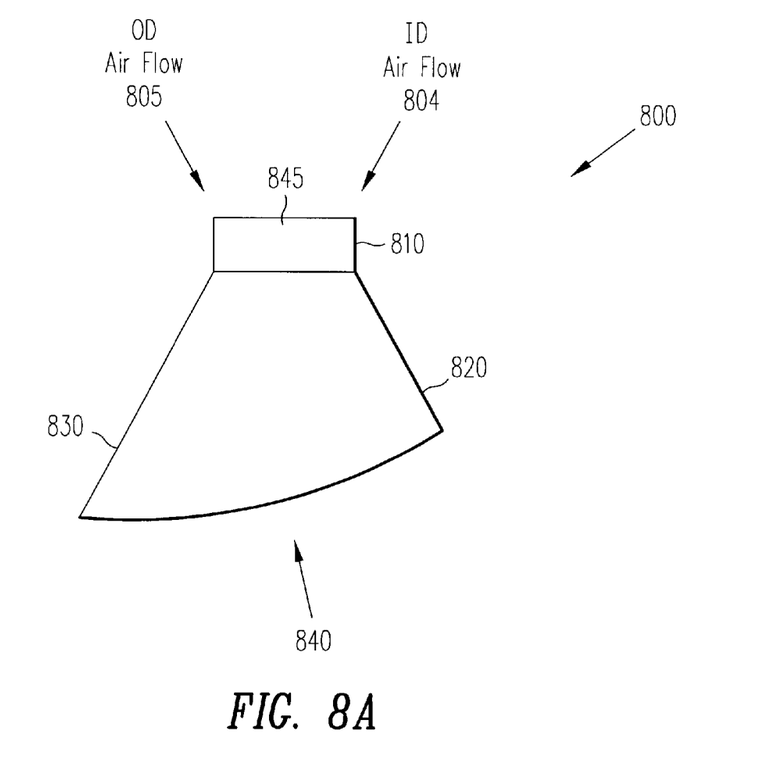
FIG. 8A illustrates one embodiment of an air bearing pad of the present invention.
Figure 8B:
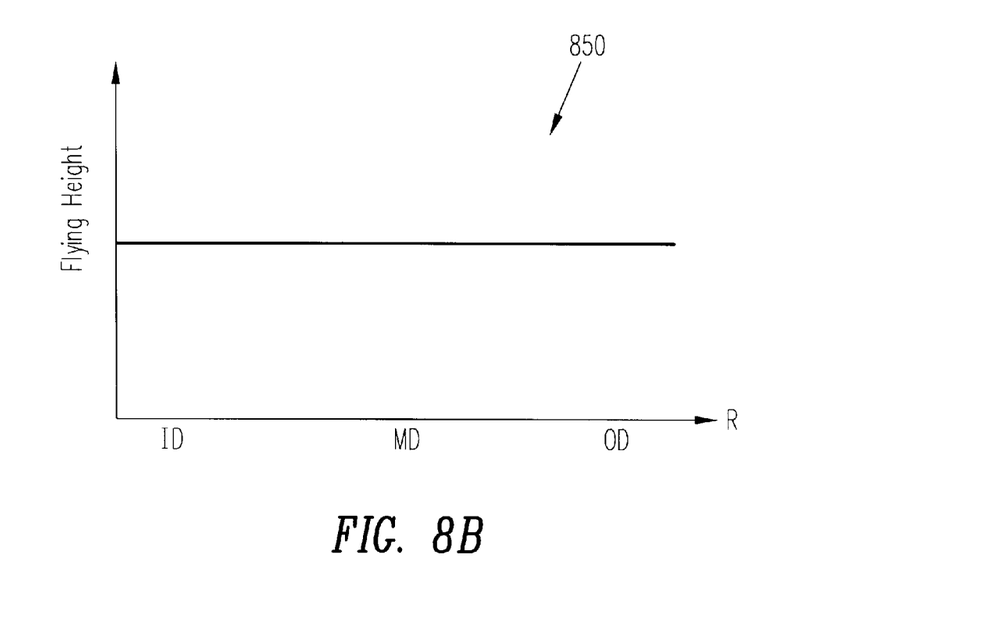
FIG. 8B illustrates a flying height profile of a tri-pad air bearing design that includes three air bearing pads 800.

FIG. 8B also illustrates an example of a desired flying height profile. The flying height profile 850 is particularly well suited for contact start/stop magnetic storage systems that texturizes the entire disk surface to improve stiction at the head-to-disk interface during start-up. The flying height profile 850 measures the flying height of a slider with respect to the radius of the disk surface as the slider is moved from the ID to the OD of the disk surface. The flying height profile 850 is relatively flat over the ID, MD and OD zones.

FIG. 7B illustrates the flying height profile 850 for a tri-pad air bearing design having three air bearing pads 800. FIG. 8A illustrates an air bearing pad 800 having its trailing edge shaped to adjust the flying height profile to have a relatively fly flying height profile across all zones. Although air bearing pad 800 is described as being incorporated into a positive pressure tri-pad air bearing design, air bearing pad 800 may be used in various other positive and negative pressure air bearing designs.

Air bearing pad 800 includes a leading edge 845, which is aligned with a compression region 810. Compression region 810 may include a taper or a shallow stepped surface that provides air bearing pad 800 with sufficient compression. Air bearing pads 800 may include diverging rail edges 820 and 830. Note that rail edge 830 is longer than rail edge 820. For one embodiment, leading edge of air bearing pad 800 is substantially parallel to the leading edge of a slider while trailing edge 840 curves upward from rail edge 830 to rail edge 820. Unlike, trailing edges 540, 640, and 740, trailing edge 840 does not have a bell shaped curved. By providing a pressurization zone that is largest at the OD, smallest at the ID and in between at the MD, a relatively constant flying height is maintained across all zones.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An air bearing slider, comprising:
   A slider body having leading and trailing edges, an air bearing surface, a first surface recessed with respect to the air bearing surface, and at least one compression region, the air bearing surface including at least one air bearing pad having diverging side edges, a leading edge and a trailing edge, the leading edge of said air bearing pad is positioned substantially adjacent to said compression region, wherein the trailing edge has a curvature shaped to provide a desired flying height profile of the air bearing slider.

2. The air bearing slider of claim 1, wherein the at least one compression region represents at least one tapered region.

3. The air bearing slider of claim 1, wherein the at least one compression represents at least one stepped region.

4. The air bearing slider of claim 1, wherein the at least one air bearing pad includes two air bearing pads formed near the leading edge of the air bearing slider and one air bearing pad formed near the trailing edge of the air bearing slider.

5. The air bearing slider of claim 1, wherein the air bearing slider is configured to fly above a disk surface between an inner zone and an outer zone of the disk surface, a first portion of the air bearing surface is configured to provide a first pressurization zone while the air bearing slider is flying above the inner zone, a second portion of the air bearing surface is configured to provide a second pressurization zone while the air bearing slider is flying above the outer zone, wherein the first portion of the air bearing surface having a larger surface area than the second portion of the air bearing surface.

6. The air bearing slider of claim 1, wherein the two diverging side edges include an inner side rail and an outer side rail, wherein the inner side edge is positioned to fly closer to the inner diameter than the outer diameter of the disk surface and the outer side edge is positioned to fly closer to the outer diameter than the inner diameter of the disk surface.

7. The air bearing slider of claim 6, wherein the inner side edge is longer than the outer side edge.

8. The air bearing slider of claim 7, wherein the leading edge of the air bearing pad is substantially parallel to one of the leading and trailing edges of the air bearing slider and the trailing edge of the air bearing pad is substantially angled with respect to one of the leading and trailing edges of the air bearing slider.

9. The air bearing slider of claim 7, wherein the leading edge of the air bearing pad is substantially parallel to one of the leading and trailing edges of the air bearing slider and the trailing edge of the air bearing pad has a substantially bell shaped curvature.

10. The air bearing slider of claim 9, wherein the inner and outer side edges are substantially the same length.

11. The air bearing slider of claim 10, wherein the inner side edge is shorter than the outer side edge.

12. The air bearing slider of claim 1, wherein the trailing edge has an asymmetrical bell shaped curvature.

13. The air bearing slider of claim 1, wherein the trailing edge has a substantially symmetrical bell shaped curvature.

14. A magnetic storage system, comprising:
   a disk for storing data;
   a slider operable to support a transducer for accessing the data from said disk, said slider including a slider body having leading and trailing edges, an air bearing surface, a first surface recessed with respect to the air bearing surface, and at least one compression region, the air bearing surface including at least one air bearing pad having diverging side edges, a leading edge and a trailing edge, the leading edge of said air bearing pad, is positioned substantially adjacent to said compression region, wherein the trailing edge has a curvature shaped to provide a desired flying height profile of the air bearing slider;
   an actuator assembly supporting the slider, the actuator assembly operable to position the slider to access the data from the disk; and
   a spindle motor assembly for rotating the disk.

15. The magnetic storage system of claim 14, wherein the slider is configured to fly above a disk surface between an inner zone and an outer zone of the disk surface, a first portion of the air bearing surface is configured to provide a first pressurization zone while the slider is flying above the inner zone, a second portion of the air bearing surface is configured to provide a second pressurization zone while the slider is flying above the outer zone, wherein the first portion of the air bearing surface having a larger surface area than the second portion of the air bearing surface.

16. The magnetic storage system of claim 14, wherein the two diverging side edges of the at least one air bearing pad include an inner side rail and an outer side rail, wherein the inner side edge is positioned to fly closer to the inner diameter than the outer diameter of the disk surface and the outer side edge is positioned to fly closer to the outer diameter than the inner diameter of the disk surface.

17. The magnetic storage system of claim 14, wherein the trailing edge of the at least one air bearing pad has an asymmetrical bell shaped curvature.

18. The magnetic storage system of claim 14, wherein the trailing edge of the at least one air bearing pad has a substantially symmetrical bell shaped curvature.

19. An air bearing slider, comprising:
   a slider body having
      leading and trailing edges;
      an air bearing surface;
      a first surface recessed with respect to the air bearing surface;
      at least one compression region, and;
   said air bearing surface including at least one air bearing pad having
      diverging side edges, and
      a leading edge and a trailing edge, the leading edge of said air bearing pad is positioned substantially adjacent to said compression region, wherein said trailing edge has a curvature shaped to provide a desired flying height profile of the air bearing slider, wherein said air bearing slider is configured to fly above a disk surface between an inner zone and an outer zone of the disk surface, a first portion of the said bearing surface is configured to provide a first pressurization zone while said air bearing slider is flying above the inner zone, a second portion of said air bearing surface is configured to provide a second pressurization zone while said air bearing slider is flying above the outer zone, wherein said first portion of the air bearing surface having a larger surface area than said second portion of said air bearing surface, wherein said air bearing slider is configured to fly above a middle zone of the disk surface, and wherein a third portion of said air bearing surface is configured to provide a third pressurization zone while said air bearing slider is flying above the middle zone, the third portion of said air bearing surface having a surface area smaller than at least one of the first and second portions of said air bearing surface.

20. A magnetic storage system, comprising:

a disk having a surface for storing data;

a slider operable to support a transducer for accessing the data from said disk, said slider including a slider body having leading and trailing edges, an air bearing surface, a first surface recessed with respect to the air bearing surface, and at least one compression region, said air bearing surface including at least one air bearing pad having diverging side edges, a leading edge and a trailing edge, said leading edge of said air bearing pad being positioned substantially adjacent to said compression region, wherein the trailing edge has a curvature shaped to provide a desired flying height profile of the air bearing slider;

an actuator assembly supporting said slider, the actuator assembly operable to position said slider to access the data from said disk; and, a spindle motor assembly for rotating the disk, wherein said slider is configured to fly above said disk surface between an inner zone and an outer zone of said disk surface, a first portion of said bearing surface being configured to provide a first pressurization zone while said slider is flying above the inner zone, a second portion of said air bearing surface being configured to provide a second pressurization zone while said slider is flying above the outer zone, wherein the first portion of said air bearing surface having a larger surface area than the second portion of said air bearing surface, wherein the said bearing slider being configured to fly above a middle zone of said disk surface, and wherein a third portion of said air bearing surface being configured to provide a third pressurization zone while said air bearing slider is flying above the middle zone, the third portion of said air bearing surface having a surface area smaller than at least one of the first and second portions of said air bearing surface.

* * * * *